(12) United States Patent
Tsai et al.

(10) Patent No.: US 11,417,151 B2
(45) Date of Patent: Aug. 16, 2022

(54) ADAPTIVE ROLLING SHUTTER IMAGE SENSOR AND IR EMITTER CONTROL FOR FACIAL RECOGNITION

(71) Applicant: Advanced Micro Devices, Inc., Santa Clara, CA (US)

(72) Inventors: Chang-Che Tsai, Hsinchu (TW); Chih-Wei Li, Hsinchu (TW); Po-Min Wang, Hsinchu (TW); Yang Wang, Shanghai (CN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/722,499

(22) Filed: Dec. 20, 2019

(65) Prior Publication Data

US 2021/0182582 A1 Jun. 17, 2021

(30) Foreign Application Priority Data

Dec. 12, 2019 (CN) .......................... 201911274108.9

(51) Int. Cl.
*G06K 9/00* (2022.01)
*H04N 5/353* (2011.01)
*G06V 40/40* (2022.01)
*G06V 40/16* (2022.01)

(52) U.S. Cl.
CPC ............ *G06V 40/40* (2022.01); *G06V 40/166* (2022.01); *H04N 5/3532* (2013.01)

(58) Field of Classification Search
CPC ........... G06K 9/00899; G06K 9/00255; H04N 5/3532
See application file for complete search history.

(56) References Cited

U.S. PATENT DOCUMENTS

| 2010/0309340 | A1* | 12/2010 | Border | ............... | H04N 5/35554 348/241 |
| 2014/0204257 | A1* | 7/2014 | Wang | ..................... | H04N 5/374 348/308 |
| 2014/0207517 | A1* | 7/2014 | Oshima | ................ | H04N 5/3532 705/7.29 |
| 2017/0364736 | A1* | 12/2017 | Ollila | ................... | H04N 5/3532 |

* cited by examiner

*Primary Examiner* — Clifford Hilaire
*Assistant Examiner* — Tyler B Edwards
(74) *Attorney, Agent, or Firm* — Volpe Koenig

(57) ABSTRACT

A processing device comprises a memory configured to store data and a processor. The processor is configured to control an exposure timing of a rolling shutter image sensor and an IR illumination timing of an object, by an IR light emitter, by switching between a first operation mode and a second operation mode. In the first operation mode, a sequence of video frames, each having a plurality of pixel lines, comprises a frame in which each pixel line is exposed to IR light emitted by the IR light emitter; a frame which is partially exposed to the IR light and a frame in which no pixel line is exposed to the IR light. In the second operation mode, alternating video frames of the sequence comprise one of a frame in which each pixel line is exposed to the IR light and a frame in which no pixel line is exposed to the IR light.

20 Claims, 7 Drawing Sheets

IRLI/ELI=5

| TALI | SNR | Operation mode |
|------|------|------|
| 48 | 1.38 | 2 |
| 59 | 3.12 | 2 |
| 60 | 7.46 | 1 |
| 198 | 9.81 | 1 |
| 199 | 8.59 | 2 |
| 256 | 9.25 | 2 |

FIG. 7A

IRLI/ELI=25

| TALI | SNR | Operation mode |
|------|------|------|
| 16 | 6.87 | 2 |
| 27 | 9.86 | 2 |
| 28 | 11.58 | 1 |
| 92 | 15.74 | 1 |
| 93 | 15.21 | 2 |
| 172 | 17.36 | 2 |

FIG. 7B

ADAPTIVE ROLLING SHUTTER IMAGE SENSOR AND IR EMITTER CONTROL FOR FACIAL RECOGNITION

CROSS REFERENCE TO RELATED APPLICATION

This application claims priority to Chinese Patent Application No. 201911274108.9, filed Dec. 12, 2019, the entire contents of which is hereby incorporated by reference as if fully set forth herein.

BACKGROUND

Automated facial recognition has become an increasingly popular area of computer vision technology due to its wide range of applicability, including commercial and law enforcement applications. Facial recognition systems offer an enhanced authenticating security feature in both mobile devices and desktop computers. For example, facial recognition is used to authenticate users of devices by identifying features (e.g., facial features) of the users in acquired images (e.g., images acquired via a camera of the device) and comparing the identified features in the acquired images to stored features of previously identified people.

BRIEF DESCRIPTION OF THE DRAWINGS

A more detailed understanding can be had from the following description, given by way of example in conjunction with the accompanying drawings wherein:

FIG. 7A is a table showing examples of points at which the modes are switched between the first operation mode and the second mode based on the TALI and SNR values based on the first IR intensity ratio in FIG. 6A; and FIG. 7B is a table showing examples of points at which the modes are switched between the first operation mode and the second mode based on the second IR intensity ratio in FIG. 6B.

DETAILED DESCRIPTION

Figure 1:
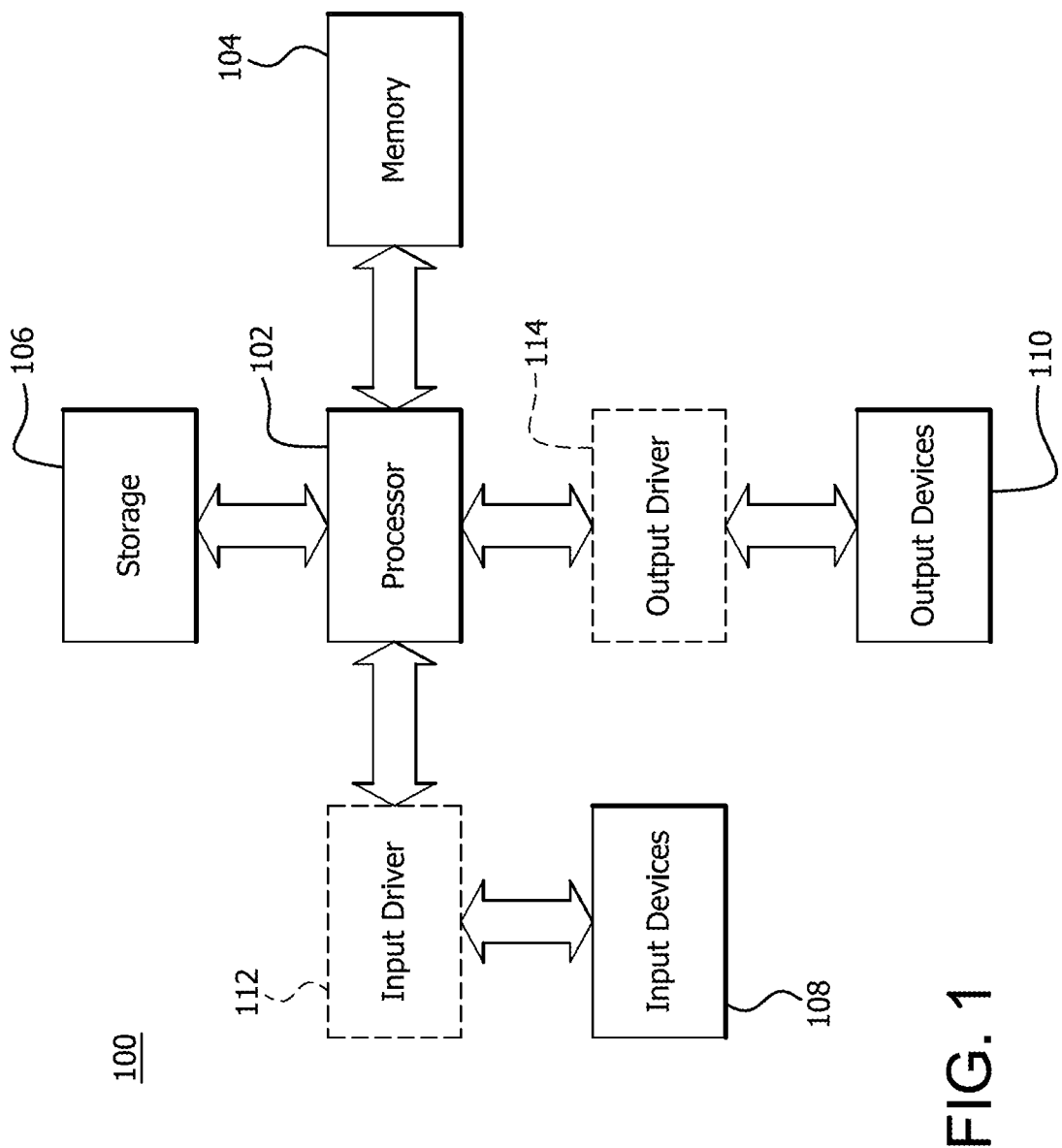
FIG. 1 is a block diagram of an example device in which one or more features of the disclosure can be implemented.

Successful facial recognition systems rely on accurate identification of the live person (e.g., the user of a device) acquired in the images. Image spoofing, which uses a substitute (e.g., photo or video) of the live person's face, can detrimentally affect the accuracy of the identification. Some facial recognition systems use infrared (IR) radiation as an anti-spoofing measure. IR radiation is used to identify both external biometric and internal features (e.g., muscles). In addition, features irradiated by the IR light are not displayed in photos.

Some facial recognition systems include image sensors which acquire video frames or images using one of a rolling shutter technique and a global shutter technique. When global shutter is used, the pixels of an entire frame are exposed together during the same exposure time period. After each of the pixels are exposed, the pixels are read out (e.g., analog values of pixels in the sensor cells are sent to analog to digital converter (ADC) and converted to digital values) during a readout time period. The pixels of the next frame are not exposed until after the data for each of the pixels of the previous frame are read out (i.e., after the readout time period is completed). Because each of the pixels exposed together during the same exposure time period, buffers are used to store the read-out values of the exposed pixels, which increases power consumption.

In contrast, when rolling shutter is used, each line (e.g., horizontal row of pixels or vertical column of pixels) of a frame is exposed separately and read out. After one line of pixels is read out, the next line of pixels is read out (i.e., the image sensor enters the exposure of the next line some time earlier). Because each line of a frame is exposed separately, rolling shutter can result in spatial distortion of fast-moving objects in the video. The distortion is less likely, however, when the objects move at a relatively slow rate and are temporally oversampled by the frame rate. While the exposure time period is the same for each line, the start time for each exposure line is delayed by a delay time period (i.e. blanking time period), which is controlled such that time difference between the start of each readout time period is at least sufficient for the readout circuit to read out each line. The blanking time period further includes the time for idle and reset of sensor pixels.

When rolling shutter is used, portions of frames can be illuminated non-uniformly by the IR light. For example, portions of frames become partially illuminated. It is difficult to accurately identify a person from features in partially illuminated frames. The present disclosure provides facial recognition processing devices and methods which utilize the advantage of decreased power consumption via rolling shutter (compared to global shutter) while avoiding non-uniform illumination. For example, frames are processed via a first mode, in which partially illuminated frames are dropped such that the frames used for authentication are uniformly illuminated, and a second mode in which the timing (e.g., LED-on and LED-off) of the IR light is controlled such that each frame is uniformly illuminated.

The present disclosure provides processing devices and methods for adaptively controlling the IR timing and exposure timing of a rolling shutter image sensor to enhance the SNR image quality of images acquired for facial recognition. The devices and methods switch between operating modes according to an automatic exposure (AE) target setting (e.g., a TALI pixel range per frame) and an IR intensity ratio of a LED IR luminance pixel intensity (IRLI) to an environmental IR luminance pixel intensity (ELI). The visible luminance pixel intensity represents the visible light energy captured by the pixels (e.g., RGB pixels). The devices and methods reduce power consumption (e.g., IR LED power consumption) while maintaining or enhancing image quality.

A processing device comprises a memory configured to store data and a processor. The processor is configured to control an exposure timing of a rolling shutter image sensor and an IR illumination timing of an object, by an IR light emitter, by switching between a first operation mode and a second operation mode. In the first operation mode, a sequence of video frames, each having a plurality of pixel lines, comprises a frame in which each pixel line is exposed to IR light emitted by the IR light emitter; a frame which is partially exposed to the IR light and a frame in which no pixel line is exposed to the IR light. In the second operation mode, alternating video frames of the sequence comprise one of a frame in which each pixel line is exposed to the IR light and a frame in which no pixel line is exposed to the IR light.

A method comprising acquiring a sequence of video frames comprising an object. The method also comprises controlling a timing of rolling shutter exposure of the video frames and a timing of infrared (IR) illumination of the object by switching between a first operation mode and a second operation mode. In the first operation mode, the sequence of video frames, each having a plurality of pixel lines, comprises a frame in which each pixel line is exposed to the IR light, a frame which is partially exposed to IR light and a frame in which no pixel line is exposed to the IR light. In the second operation mode, alternating video frames of the sequence comprise one of a frame in which each pixel line is exposed to the IR light and a frame in which no pixel line is exposed to the IR light.

A processing device comprises memory configured to store data and a processor. The processor is configured to control an exposure timing of a rolling shutter image sensor and an infrared (IR) illumination timing of an object, by an infrared (IR) light emitter, by switching between a first operation mode and a second operation mode. In the first operation mode, a sequence of video frames, each having a plurality of pixel lines, is processed in which a first time period, during which the IR light emitter is emitting IR light, is greater than a second time period during which each pixel line of a frame is exposed to the IR light emitted by the IR light emitter. The second time period is equal to an effective time period, during which the IR light emitted within the second time period, but not outside the second time period, is captured by the pixel lines in the frame. In the second operation mode, the second time period is less than the first time period and the effective time period is equal to the first time period.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. In various alternatives, the memory 104 is located on the same die or the same package as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present.

Figure 2:
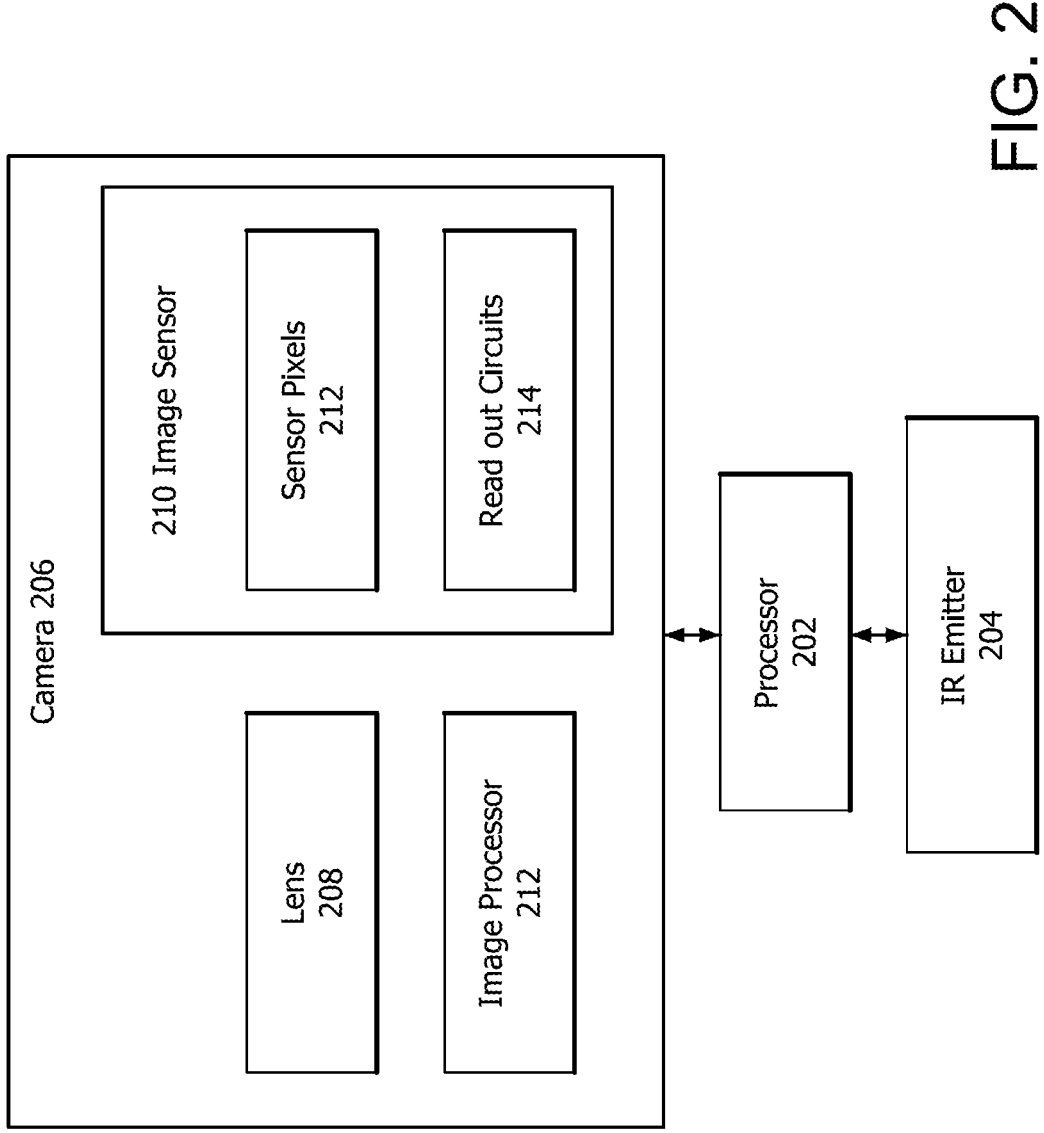
FIG. 2 is a block diagram illustrating example components of a processing device in which one or more features of the disclosure can be implemented.

FIG. 2 is a block diagram illustrating example components of a processing device 200 in which one or more features of the disclosure can be implemented. Examples of processing device 200 include a computer, a gaming device, a handheld device, a set-top box, a television, a mobile phone, or a tablet computer.

As shown in FIG. 2, processing device 200 includes processor 202, IR emitter 204 and camera 206. Camera 206 includes lens 208, image sensor 210 and image signal processor 212. Image sensor 210 consists of sensor pixels 212 and read-out circuits 214. The key component in read-out circuits is analog to digital converter (ADC) circuit. In some examples, image processor 212 is integrated as part of processor 202, instead of camera 206.

IR emitter 204 is, for example, an IR light emitting diode (LED) which emits light in the infrared range of the electromagnetic radiation spectrum. IR emitter 204 emits IR light onto an object (not shown), such as a head of a person.

Lens 208 includes a single lens or an assembly of lenses which focuses the IR light reflected from the object. Image sensor 210 is, for example, a complementary metal-oxide-semiconductor (CMOS) based image sensor, which includes an array of cells, each corresponding to a pixel of an image (i.e., frame). Image sensor 210 uses rolling shutter to expose the pixels to light, including the IR light emitted by the IR emitter 204 and environmental light passing through lens 208. The light captured at each cell is transformed into electrons having a value (i.e., an accumulated charge). The charge (i.e., analog value) of each cell is read out, during a read-out time, and sent to ADC circuit 214, which converts the analog values into digital values.

As described above, when rolling shutter is used, each line of pixels of a frame is exposed for the same amount of time, but the start times and end times of the exposures are offset by a period of time. That is, the start time and end time of the exposure from one line to the next line is delayed by a delay time period (e.g., a blanking time period).

Image processor 212 controls the exposure timing of the rolling shutter image sensor 210 (e.g., the delay time period between the exposures of the lines of each frame) such that time difference between the start of each readout time period is at least sufficient for the readout circuit to read out each line. The frame rate of the video is also controlled by controlling the exposure timing of the lines of each frame.

Processor 202 is configured to control both the exposure timing of the image sensor 210 (e.g., via image processor 212) and the IR emission timing (e.g., emission duration) of the IR emitter 204. Processor 202 controls the exposure timing and the IR emission timing by switching between a first operating mode and a second operating mode according to: (1) a ratio of the LED IR luminance intensity (IRLI) to the environmental IR luminance intensity (ELI) and (2) a target average visible luminance intensity pixel range per frame (TALI).

Processor 202 also processes (e.g., measures) the digital values of the pixels of each frame, which define features of the object (e.g., the person), and compares the digital values to stored digital values, which define features of previously identified people, to determine whether the features of the person identified in the acquired video match the stored features of a person from a previously acquired video.

Figure 3:
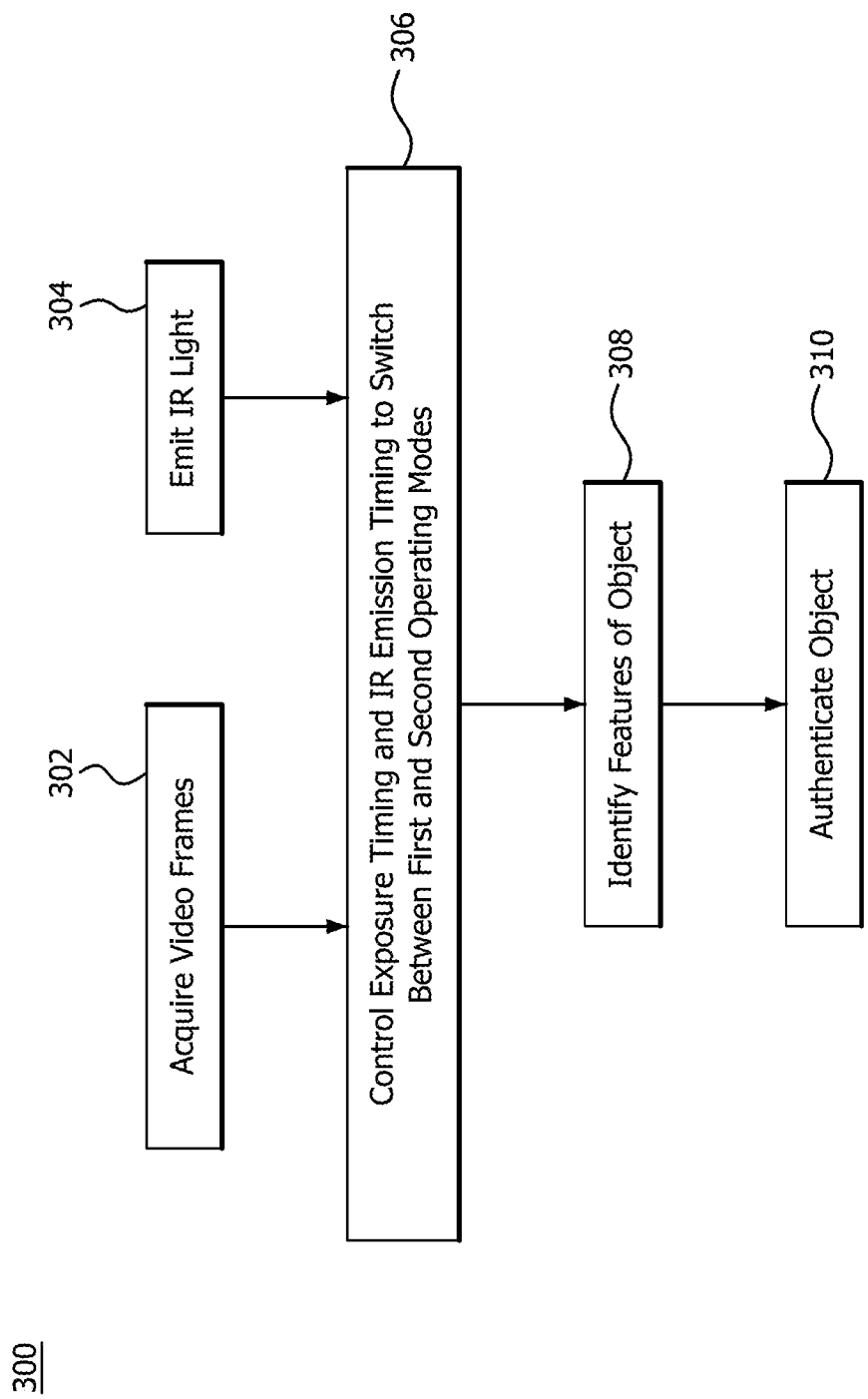
FIG. 3 is a flow diagram illustrating an example method of facial recognition according to features of the disclosure.

FIG. 3 shows a flow diagram illustrating an example method of facial recognition according to features of the disclosure. As shown at block 302, the method includes acquiring one of a sequence of frames comprising an object (e.g., a head of a person). For example, the frame is acquired by separately exposing, over time, lines of pixels of the frame via a rolling shutter image sensor.

As shown at block 304, the method includes emitting IR light at the object. The IR light is, for example, emitted via an IR LED.

As shown at block 306, the method includes controlling a timing of rolling shutter exposure of the video frames and a timing of infrared (IR) illumination of the object by switching between a first operation mode and a second operation mode.

As shown at blocks 308 and 310, the method 300 includes identifying features of the object in the sequence of video frames using the first operation mode and a second operation mode. As shown at block 310, the method 300 includes authenticating the object based on a comparison of the identified features of the object to stored features.

Figure 4:
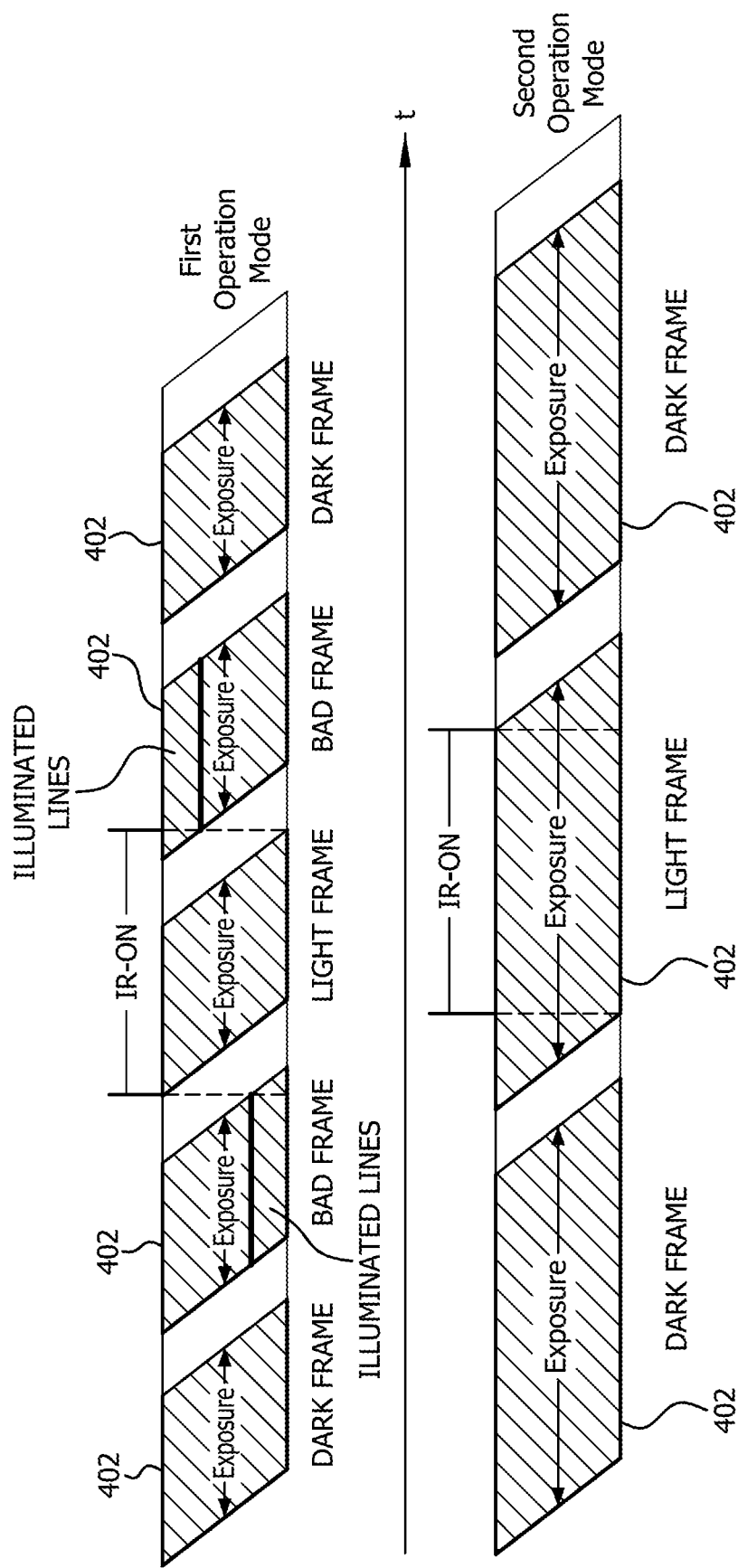
FIG. 4 is an illustration of the timing of acquiring video frames using a first operation mode and a second operation mode according to features of the disclosure.

FIGS. 4 and 5 are diagrams illustrating the exposure timing and IR illumination timing using the first operation mode and the second operation mode shown at block 306 of FIG. 3. FIG. 4 includes timing diagrams illustrating the exposure timing and IR illumination timing for acquiring a sequence of video frames 402 of a video stream using the first operation mode and a sequence of video frames 402 of the video stream using the second operation mode.

The top timing diagram of FIG. 4 shows the acquiring of the frames 402 over time t using the first operation mode. The bottom timing diagram of FIG. 4 shows the acquiring of the frames 402 over time t using the second operation mode. As shown in FIG. 4, the exposure timing of the rolling shutter image sensor 210 is controlled such that the frame rate (e.g., 30 fps) in the first operation mode is higher than the frame rate (e.g., 15 fps) in the second operation mode.

In the first operation mode, the sequence of video frames includes a frame in which each pixel line is exposed to IR light (i.e., a light frame), a frame which is partially exposed to the IR light (i.e., a bad frame) and a frame in which no pixel line is exposed to the IR light (i.e., a dark frame). For example, as shown at the top portion of FIG. 4, in the first operation mode, the video sequence includes a bad frame (e.g., frame in which lines at the end of the frame are exposed to IR light emitted by IR light emitter 204 but not the lines preceding the illuminated lines) before a light frame of the sequence and a bad frame (e.g., frame in which lines at the beginning of the frame are exposed to IR light emitted by IR light emitter 204 but not the lines following the illuminated lines) after the light frame. That is, the timing of the IR emitter 204 is controlled such that each line of pixels of the light frame is exposed during the IR emission time period (i.e., IR-ON) and no line of pixels of the dark frame is exposed during the IR-off time period (i.e. IR-OFF). The bad frames of the video sequence are, however, partially exposed during the IR emission time period. That is, the pixel lines at the bottom of the first bad frame are illuminated (i.e., pixel lines at the bottom are exposed during the IR emission time period) while the previous pixel lines were exposed prior to the start of IR emission time period and, therefore, are not illuminated by the IR light.

The pixel lines at the top of the second bad frame are illuminated (i.e., pixel lines at the top are exposed during the IR emission time period) while the remaining pixel lines are exposed after the end of IR emission time period and, therefore, are not illuminated by the IR light. Because the bad frames of the video sequence are partially exposed to the IR light (i.e., non-uniform illumination), the bad frames are dropped from the video stream. A light frame and a dark frame (e.g., dark frame to the right of the light frame and the light frame shown at the top portion of FIG. 4) together make up a frame pair. The features in a frame pair are extracted and compared to stored features for authentication in the facial recognition process.

In the second operation mode, the video stream alternates between light frames and dark frames (i.e., alternating video frames of the sequence include one of a light frame and a dark frame) and does not include bad frames. For example, as shown at the bottom of FIG. 4, the timing of the IR emitter 204 is also controlled such that each line of pixels of the light frame is exposed during the IR emission time period (i.e., IR-ON). In contrast to the first operation mode, the previously exposed frame (i.e., dark frame to the RIGHT of the light frame at the bottom portion of FIG. 4) and the next frame to be exposed (dark frame to the left of the light frame at the bottom portion of FIG. 4) are not partially exposed during the IR emission time period. The dark frame is not exposed at all during the IR emission time period. That is, just as each line of the light frame is exposed during the IR emission time period, each line of the other frames of the sequence are also exposed to the IR light emitted by the IR light emitter.

The frame rate per second of the second operation mode is controlled such that an effective frame pair (i.e., a light frame+a dark frame) rate per second is the same as the effective frame pair rate per second of the first operation mode. For example, as described in more detail below, for the first operation mode running at 30 fps, the effective frame pair rate is 7.5 frame pairs per second. For the second operation mode running at 15 fps, the effective frame pair rate is also 7.5 frame pairs per second. Accordingly, because one effective frame pair is used to recognize a face (i.e., one face recognition), the number of face recognitions per second remains the same.

That is, if the first operation mode and the second operation mode output the same number of effective frame pairs per second, then the number of face recognitions per second are also the same. A single face recognition comprises, for example, (i) acquiring an effective frame pair; (ii) acquiring a difference between the light frame and dark frame of the effective frame pair; (iii) locating the face via extracted face features from both the light frame and the difference between the light frame and the dark frame; and (iv) identifying the face as a stored previously identified face. A single face recognition is, however, not limited to these steps.

Figure 5B:
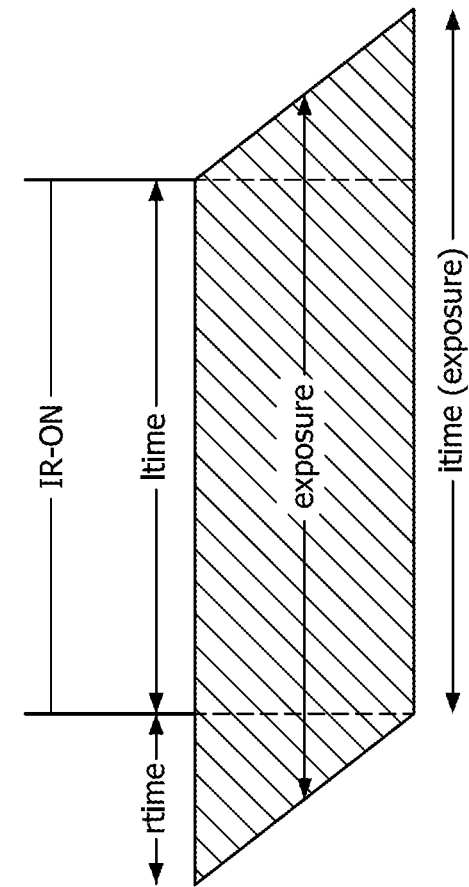
FIG. 5B shows the exposure timing and IR illumination timing for the light frame in FIG. 4 using the second operation mode.
Figure 5A:
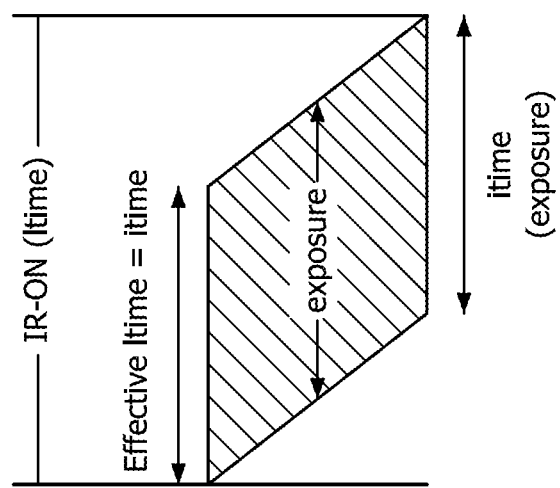
FIG. 5A shows the exposure timing and IR illumination timing for the light frame in FIG. 4 using the first operation mode.

As shown in FIG. 5A, for the first operation mode, the time period in which the IR LED is emitting IR light (i.e., the IR-ON time or ltime) is greater than the time period in which each pixel line is exposed (i.e., the itime period). Accordingly, the effective ltime period (i.e., time period in which only the LED light within the itime period is captured (e.g., by image sensor 210)) is equal to the itime period. As shown in FIG. 5B, for the second operation mode, the ltime period (i.e., IR-ON time) is less than the itime period (i.e., exposure time) and all of the LED light within the ltime period is captured (e.g., by image sensor 210). Accordingly, the effective ltime period is equal to the ltime period.

The timing of the rolling shutter exposure and the timing of the IR illumination are controlled by switching between the first and second operation modes. The determination of whether to use the first operation mode or the second operation mode is based on at least one of: (1) a ratio of an average IR luminance intensity (IRLI) of pixels of interest (e.g., facial pixels, pixels neighboring the facial pixels when the face detection is not precise and each pixel in the frame when there is no face detection to locate the pixels of interest) to an average environmental IR luminance intensity (ELI) of pixels of interest; and (2) a target average visible luminance intensity (TALI) per frame (e.g., a TALI range). While the second operation mode uses IR LED energy more efficiently than the first operation mode, the first operation mode typically includes a better SNR because the IR LED is on for the entire duration of the exposure time period (i.e., the itime). The pixels of interest include, for example, facial pixels, which can be used to identify the pixels of interest. Alternatively, pixels of different luminance levels in the light and dark frames can be used to identify the pixels of interest.

FIGS. 5A and 5B illustrate the exposure timing and IR illumination timing shown in FIG. 4 in more detail. FIG. 5A shows the exposure timing and IR illumination timing for the light frame in the top timing diagram of FIG. 4 using the first operation mode. FIG. 5B shows the exposure timing and IR illumination timing for the light frame in bottom timing diagram of FIG. 4 using the second operation mode.

As shown in FIG. 5A, for the first operation mode, the effective ltime period is equal to the itime period. The itime period includes, for example, a time range of about 10 ms to about 33 ms, which maintains a frame rate of about 30 frames per second and effective frame pair rates of about 7.5 frame pairs per second. The TALI is determined, for example, by the following:

$$TALI = J^* IRLI^* itime + K^* ELI^* itime \quad \text{Equation (1)}$$

where $J^*IRLI$ is the visible luminance contribution emitted by the IR emitter (e.g., IR LED), J is a predetermined value representing a luminance ratio of the IR light emitted by the IR LED to the visible light emitted by the IR LED $K^*ELI''$ is the visible luminance contribution from environmental light and K is a predetermined value representing a luminance ratio of the environmental IR light to the environmental visible light.

The signal portion of the captured IR image is IRLI*itime and the extrinsic noise portion is ELI*itime. The SNR is, for example, determined by (1) a ratio of IRLI to ELI and (2) the AE target TALI.

For each pixel acquired in the first operation mode, the captured energy is equal to the sum of IR_LED*itime and ENV*itime, where IR_LED is the IR light emitted by the IR LED, which can include both visible light (e.g., light captured by RGB pixels in an RGBIR sensor) and IR light (e.g., light captured by the IR pixels in an RGBIR sensor) and ENV is the environment light, which may include both visible and IR light.

The energy captured by each pixel acquired in the second operation mode is equal to the ltime. As shown in FIG. 5B, for the second operation mode, itime is greater than ltime. Accordingly, rtime is greater than zero. The start of ltime (i.e., IR LED ON time) occurs after the start of the exposure of the last pixel line of the frame, and the end time point of ltime is before the exposure end time point of the first pixel line. The itime period includes, for example, a time range of about 10 ms to about 66 ms, which maintains a frame rate of about 15 frames per second and effective frame pair rates of about 7.5 frame pairs per second. The TALI is determined, for example, by the following:

$$TALI = J^*IRLI^*ltime + K^*ELI^*itime \quad \text{Equation (2)}$$

where $J^*IRLI$ is the visible luminance contribution emitted by the IR emitter (e.g., IR LED), J is the equivalent IRLI crosstalk ratio from IR, J is a first predetermined value, $K^*ELI''$ is the visible luminance contribution from the environmental light and K is the equivalent ELI crosstalk_ratio from IR, K is a second predetermined value.

The signal portion of the captured IR image is IRLI*ltime and the extrinsic noise portion is ELI*itime. The SNR is, for example, determined by (1) a ratio of IRLI to ELI and (2) the AE target TALI.

Because itime is larger than ltime, the signal noise ratio of the second operation mode is greater than that of the first operation mode when (1) IRLI is sufficiently larger than ELI and (2) the AE target TALI is equal to or greater than a first threshold. For other target frame pairs per second, we may adjust the corresponding itime and ltime for each mode accordingly.

Figure 6B:
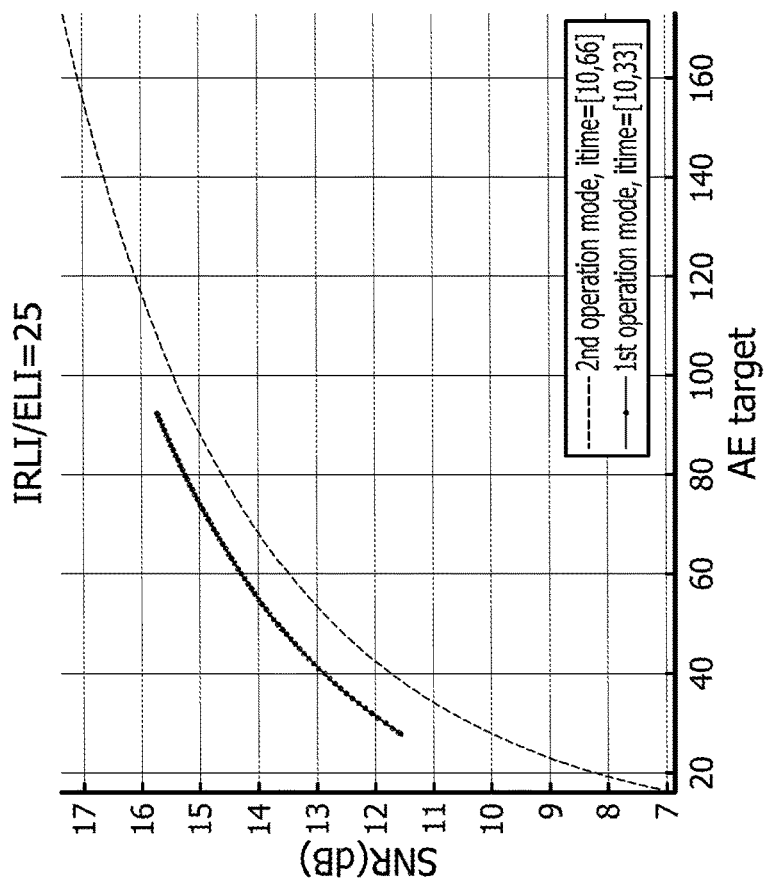
FIG. 6B is a graphical illustration of a SNR influence on a TALI setting based on a second IR intensity ratio according to features of the disclosure.
Figure 6A:
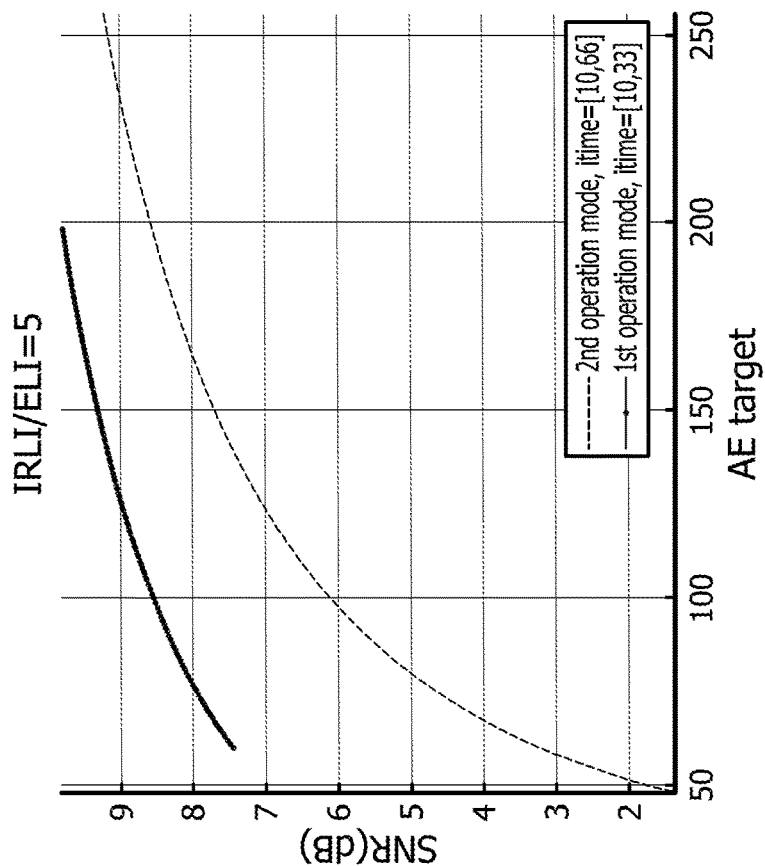
FIG. 6A is a graphical illustration of a signal to noise ratio (SNR) influence on a target average luminance intensity (TALI) setting based on a first IR intensity ratio according to features of the disclosure.

FIG. 6A is a graphical illustration of SNR influence on the AE target setting (i.e., TALI of pixels per frame) when IRLI/ELI=5. FIG. 6B is a graphical illustration of SNR influence on the AE target setting when IRLI/ELI=25. The SNR (in dB) is represented on the vertical axis and the AE target setting (in luminance intensity values) is represented on the horizontal axis.

Based on the information shown in FIG. 6A, the first operation mode (in which the itime period includes a range of about 10 ms to about 33 ms, thus 30 frames per second can be achieved) is used (e.g., switched to first mode or remain in first mode) when the AE target setting for a frame (or a portion of interest of a frame) is achievable by the first operation mode and its SNR is greater in the first operation mode than the second operation mode.

The AE target setting is determined to be achievable by, for example, by determining values for J, K, IRLI and ELI from Equations (1) and (2). In a light frame of the effective frame pair, the average interested RGB pixel level is J*IRLI*ltime+K*ELI*itime while the average interested IR pixel level is IRLI*ltime+ELI*itime. In a dark frame of the effective frame pair, the average interested RGB pixel level is K*ELI*itime while the average interested IR pixel level is ELritime. From the difference between the light frame and the dark frame, the average interested RGB pixel level is J*IRLI*ltime while the average interested IR pixel level is IRLI*ltime. The ratio IRLI/ELI is determined and simulations are performed for different permutations, which are, for example, used to generate the example graphs shown FIGS. 6A and 6B. Based on the target SNR or target AE, the itime, the ltime and one of the two operation modes are determined.

FIG. 7A is a table showing examples of points at which the modes are switched between the first operation mode and the second mode based on the TALI and SNR values when IRLI/ELI=5. FIG. 7B is a table showing examples of points at which the modes are switched between the first operation mode and the second mode based on the TALI and SNR values when IRLI/ELI=25.

The IRLI/ELI ratio is measured, for example, from facial IR pixels of a light and dark frame and the corresponding J and K values from the ratio between visible and IR pixels. Based on a predetermined TALI target in effective frame pairs, the SNR values for the first and second operation modes are determined (e.g., the values in the tables shown in FIGS. 7A and 7B are determined). Accordingly, an adaptive determination of which operation mode to use is made based on the IRLI/ELI ratio and the AE target setting (i.e., TALI).

An AE target is, for example, determined which switches from the first operation mode to the second operation mode to provide a greater SNR for the pixels of interest (e.g., pixels for a frame or a portion of a frame).

Based on the information shown in FIG. 6B, the second operation mode (in which the itime period includes a range of about 10 ms to about 66 ms) is used when the AE target setting is achievable by the second operation mode and its SNR is greater than the first operation mode. In some examples, target curves (e.g., curves shown in FIGS. 6A and 6B) are interpolated from stored information (e.g., information shown in the tables at FIGS. 7A and 7B). For example, in FIG. 6A, an AE target less than 60 or greater than 198 is not achievable by the first operation mode. The graphical information shown in FIG. 6A (e.g., resulting from simulations) can be converted to information in a table (e.g., a table shown in FIG. 7A or 7B) to determine whether or not an AE target is achievable.

As used herein, a program includes any sequence of instructions (e.g., an application, a module (e.g., a stitching module for stitching captured image data), a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. Processing of data (e.g., video data) includes for example, sampling data, encoding data, compressing data, reading and writing data, storing data, converting data to different formats (e.g., color spaces) and performing calculations and controlling one or more components (e.g., encoder and decoder) to process data.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory configured to store data; and
   a processor configured to control an exposure timing of a rolling shutter image sensor and an infrared (IR) illumination timing of an object, by an infrared (IR) light emitter, by switching between:
   a first rolling shutter operation mode in which a sequence of video frames, each having a plurality of pixel lines, comprises:
   a frame in which each pixel line is exposed to IR light;
   a frame which is partially exposed to the IR light; and
   a frame in which no pixel line is exposed to the IR light; and
   a second rolling shutter operation mode in which alternating video frames of the sequence comprise one of:
   a frame in which each pixel line is exposed to the IR light; and
   a frame in which no pixel line is exposed to the IR light.

2. The processing device according to claim 1, wherein the processor is configured to switch between the first operation mode and the second operation mode based on at least one of:
   a ratio of an average IR luminance intensity of pixels of one or more of the frames to an environmental IR luminance intensity of the pixels; and
   a target average luminance intensity (TALI) of the pixels per frame.

3. The processing device according to claim 2, wherein the processor is configured to use the first operation mode when the TALI per frame is greater than a first TALI threshold and less than or equal to a second TALI threshold.

4. The processing device according to claim 3 wherein the first TALI threshold and the second TALI threshold are determined according to a LED IR luminance pixel intensity and an environmental IR luminance pixel intensity.

5. The processing device according to claim 2, wherein the processor is configured to:
determine a signal to noise ratio (SNR) based on the ratio of the average IR luminance pixel intensity of one or more of the frames to the environmental IR luminance pixel intensity of the one or more frames; and
use the first operation mode when the SNR is greater than or equal to a first SNR threshold and less than or equal to a second SNR threshold.

6. The processing device according to claim 3, wherein the processor is configured to switch between the first operation mode and the second operation mode by using stored SNR values and TALI values for the ratio of an average IR luminance intensity of pixels to the environmental IR luminance intensity of the pixels.

7. The processing device according to claim 1, wherein the processor is further configured to:
identify features of the object in the sequence of video frames; and
authenticate the object based on a comparison of the identified features of the object to stored features.

8. The processing device according to claim 1, wherein the processor is further configured to control a frame rate of the second operation mode such that a first frame rate, of an effective frame pair comprising the frame in which each pixel line is exposed to the IR light and the frame in which no pixel line is exposed to the IR light using the second operation mode, is the same as a second frame rate of an effective frame pair, comprising the frame in which each pixel line is exposed to the IR light and the frame in which no pixel line is exposed to the IR light using the first operation mode.

9. A method comprising:
acquiring a sequence of video frames comprising an object; and
controlling a timing of rolling shutter exposure of the video frames and a timing of infrared (IR) illumination of the object by switching between:
a first rolling shutter operation mode in which the sequence of video frames, each having a plurality of pixel lines, comprises:
a frame in which each pixel line is exposed to the IR light;
a frame which is partially exposed to IR light; and
a frame in which no pixel line is exposed to the IR light; and
a second rolling shutter operation mode in which alternating video frames of the sequence comprise one of:
a frame in which each pixel line is exposed to the IR light; and
a frame in which no pixel line is exposed to the IR light.

10. The method according to claim 9, comprising:
determining a ratio of an average IR luminance intensity of pixels of one or more of the frames to an environmental IR luminance intensity of the pixels; and
switching between the first operation mode and the second operation mode based on at least one of:
the ratio of the average IR luminance intensity of pixels of one or more of the frames to an environmental IR luminance intensity of the pixels; and
a target average luminance intensity (TALI) of the pixels per frame.

11. The method according to claim 10, comprising:
using the first operation mode when the TALI per frame is greater than a first TALI threshold and less than or equal to a second TALI threshold.

12. The method according to claim 11, wherein the first TALI threshold and the second TALI threshold are determined according to a LED IR luminance pixel intensity and an environmental IR luminance pixel intensity.

13. The method according to claim 10, comprising:
determining a signal to noise ratio (SNR) based on the ratio of the average IR luminance pixel intensity of one or more of the frames to the environmental IR luminance pixel intensity of the one or more frames;
using the first operation mode when the SNR is greater than or equal to a first SNR threshold and less than or equal to a second SNR threshold.

14. The method according to claim 11, further comprising switching between the first operation mode and the second operation mode by using stored SNR values and TALI values for the ratio of an average IR luminance intensity of pixels to the environmental IR luminance intensity of the pixels.

15. The method according to claim 9, further comprising:
identify features of the object in the sequence of video frames; and
authenticating the object based on a comparison of the identified features of the object to stored features.

16. The method according to claim 9, further comprising controlling a frame rate of the second operation mode such that a first frame rate, of an effective frame pair comprising the frame in which each pixel line is exposed to the IR light and the frame in which no pixel line is exposed to the IR light using the second operation mode, is the same as a second frame rate of an effective frame pair, comprising the frame in which each pixel line is exposed to the IR light and the frame in which no pixel line is exposed to the IR light using the first operation mode.

17. The method according to claim 9, wherein, in the first operation mode, the frame which is partially exposed to IR light is acquired immediately prior to the frame in which each pixel line is exposed to the IR light and the sequence of video frames comprises another frame which is partially exposed to IR light and is acquired immediately after the frame in which each pixel line is exposed to the IR light.

18. A processing device comprising:
memory configured to store data; and
a processor configured to:
control an exposure timing of a rolling shutter image sensor and an infrared (IR) illumination timing of an object, by an infrared (IR) light emitter, by switching between:
a first rolling shutter operation mode, for processing a sequence of video frames each having a plurality of pixel lines, in which:
a first time period, during which the IR light emitter is emitting IR light, is greater than a second time period during which each pixel line of a frame is exposed to the IR light emitted by the IR light emitter; and
the second time period is equal to an effective time period, during which the IR light emitted within the second time period, but not outside the second time period, is captured by the pixel lines in the frame; and a second rolling shutter operation mode in which:
the second time period is less than the first time period; and
the effective time period is equal to the first time period.

19. The processing device of claim 18, wherein each portion of the IR light emitted during the first time period is captured by the pixel lines in the frame when the second operation mode is used.

20. The processing device of claim 18, wherein the processor is further configured to:
identify features of the object in the sequence of video frames; and
authenticate the object based on a comparison of the identified features of the object to stored features.

* * * * *